United States Patent [19]

Chan et al.

[11] Patent Number: 4,599,697

[45] Date of Patent: Jul. 8, 1986

[54] DIGITAL PWPF THREE AXIS SPACECRAFT ATTITUDE CONTROL

[75] Inventors: Fred N. Chan, Atherton; Frank C. Nilsen, Mountain View, both of Calif.

[73] Assignee: Ford Aerospace & Communications Corporation, Detroit, Mich.

[21] Appl. No.: 407,196

[22] Filed: Aug. 11, 1982

[51] Int. Cl.$^4$ ............................................... B64G 1/26
[52] U.S. Cl. ..................................... 364/434; 244/176; 244/169
[58] Field of Search ............... 364/434, 424, 432, 454, 364/455, 453; 244/765, 176, 177, 180, 168, 169, 3.22

[56] References Cited

U.S. PATENT DOCUMENTS

| | | | |
|---|---|---|---|
| 3,547,381 | 12/1970 | Shaw | 244/176 |
| 3,636,411 | 1/1972 | Bulloch | 244/176 |
| 3,643,897 | 2/1972 | Johnson, Jr. | 244/176 |
| 3,866,025 | 2/1975 | Cavanagh | . |
| 3,937,423 | 2/1976 | Johansen | 244/169 |
| 3,944,172 | 3/1976 | Becker | 244/169 |
| 4,012,018 | 3/1977 | Lorell et al. | 364/455 |
| 4,071,211 | 1/1978 | Muhlfelder et al. | 364/434 |
| 4,161,780 | 7/1979 | Rudolph et al. | 364/434 |
| 4,174,819 | 11/1979 | Brüdenle et al. | 244/176 |
| 4,358,076 | 11/1982 | Lange et al. | 244/176 |
| 4,396,878 | 8/1983 | Cole et al. | 244/176 |

Primary Examiner—Errol A. Krass
Assistant Examiner—Thomas G. Black
Attorney, Agent, or Firm—Edward J. Radlo; Robert D. Sanborn

[57] ABSTRACT

A digital system for controlling the attitude of a spacecraft (14), e.g., a satellite, with respect to three orthogonal axes. The system can control satellites (14) in parking orbit, transfer orbit, or final operational orbit, whether or not the satellite (14) employs one or more momentum wheels. A processor (2) converts weighted data from spacecraft sensors (12), representing angular orientation and angular velocities about each of the three axes, into thruster pulsetrain signatures to command the firing of each of six thrusters positioned about spacecraft (14), a positive and a negative thruster being positioned to impart both directions of angular momentum about each of the three axes. Each thruster pulsetrain signature is created once every processed error cycle period T1, and contains a varying number of pulses of varying widths. A negative feedback PWPF loop (2, 16, 20, 22, 24) is actuated for each of the three axes, preferably several times each T1 in order to achieve better thruster on/off resolution. The PWPF loops are preferably implemented by digital means. Serial-out shift registers (44, 46) load the thruster pulsetrain signatures into means (48, 50, 52, 54) for firing the thrusters, preferably after splitting the signature pulses into clone pulses in order to minimize the impact of errors due to asynchronization between the clock which loads the registers (44, 46) and the clock which shifts these registers. Data extenders (40, 42) eliminate possible gaps caused by asynchronization, and thus prevent unwanted on/off thruster switching.

8 Claims, 5 Drawing Figures

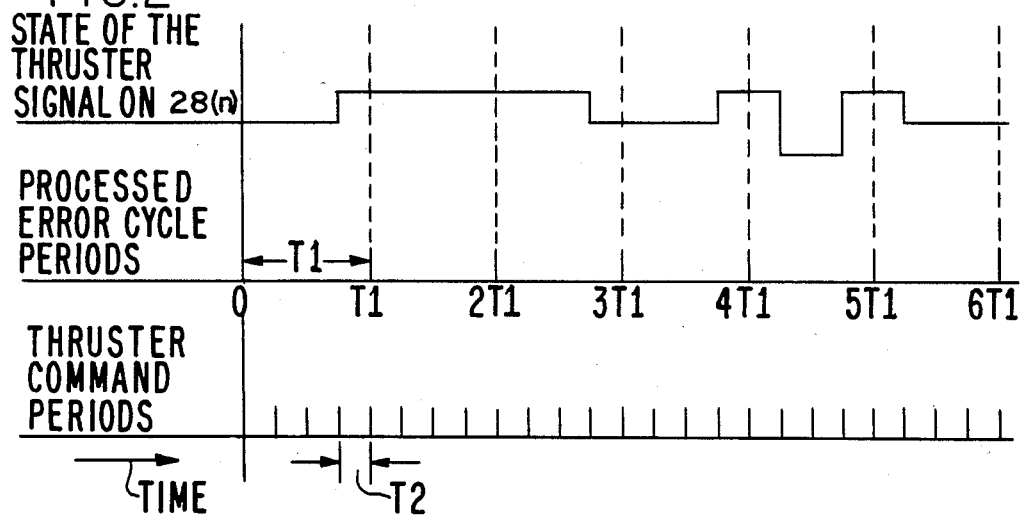
FIG. 3
FIG. 2
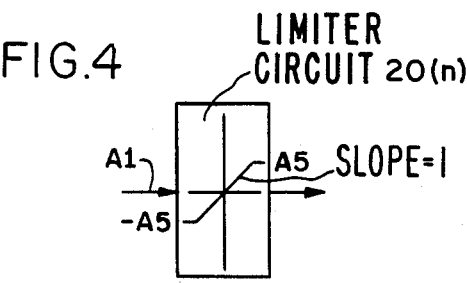
FIG. 4
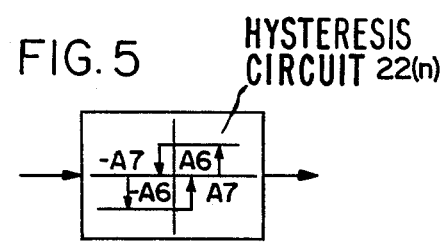
FIG. 5

DIGITAL PWPF THREE AXIS SPACECRAFT ATTITUDE CONTROL

TECHNICAL FIELD

This invention pertains to the field of controlling the attitude of a spacecraft with respect to a set of three orthogonal axes.

BACKGROUND ART

A prior art search was conducted in the public records of the U.S. Patent and Trademark Office and disclosed the following references:

U.S. Pat. No. 3,866,025 is a digital three axis attitude controller, but is not a true PWPF (Pulse Width Pulse Frequency) system as in the present invention: each pulse train has a variable number of pulses each having a fixed pulse width, whereas the present invention varies the width as well as the frequency of pulses in response to spacecraft dynamics and to control same. The cited patent does not employ shift registers as in the present invention. It discloses a system mainly for precessing the angular momentum vector of the spacecraft, without the capability to perform station-keeping and control spacecraft attitude simultaneously as in the present invention. It requires expensive rate integrating gyros in addition to sun sensors and/or earth sensors, whereas the present invention does not require rate integrating gyros. The cited reference combines information from all axes at once, while the present invention operates upon the axes independently with simple uncoupled control laws.

U.S. Pat. No. 3,937,423 discloses a technique for nutation damping while maintaining attitude control with respect to just the roll axis; the present invention, on the other hand, controls the attitude along each of three orthogonal axes. The cited reference is an analog signal processing technique, whereas the present invention, in its preferred embodiment, is a wholly digital system, offering concomitant advantages. The cited patent issues thruster pulses timed according to the spacecraft nutation period, whereas the present invention does not phase the thruster firings with nutation periods, and has a quasi-real-time response to fast spacecraft dynamics that is much shorter than the nutation period. The cited patent pertains to on-orbit control whereas the present invention has a broader range of applicability encompassing acquisitions, station-keeping, or any other maneuver that requires thruster controls. The cited patent does not produce pulses of variable widths and is therefore not a PWPF system as in the present invention.

U.S. Pat. No. 3,944,172 is an attitude control system which could possibly be extended to three axis control, although just one axis is described. It is not a PWPF system because just the pulse width, and not pulse frequency is varied within a sampling period. The cited patent does not employ shift registers, which the present invention advantageously uses to mete out the thruster command signals while freeing up its processor (2) to perform other spacecraft functions.

U.S. Pat. Nos. 3,643,897 and 4,161,780 disclose techniques associated with spin stabilization, and not three axis spacecraft control.

DISCLOSURE OF INVENTION

The present invention is a technique, wholly digital in its preferred embodiment, for controlling the attitude of a spacecraft with respect to three orthogonal axes. Although it can be implemented by analog means, the digital implementation offers the following advantages:

(1) The digital processor (2) can be shared with other spacecraft (14) functions, saving weight and power.
(2) There is no drift associated with temperature changes of analog components.
(3) Long time constant compensation can be represented as pre-programmed elements in a digital computer, saving the weight associated with heavy discrete inductors and capacitors.

The present invention can be used advantageously during all phases of the launch of spacecraft (14), e.g., in the case of a satellite, the invention can be used during the parking orbit as an automatic nutation controller; during initial transfer orbit maneuvers, including sun acquisition, earth acquisition, and apogee motor firing; and during all phases of attitude control in final operational orbit, including station-keeping maneuvers and momentum wheel unloading.

The invention can be used whether or not spacecraft (14) utilizes momentum wheels for stiffening momentum about one or more of the orthogonal axes. When momentum wheels are used, part of the present circuit can be used for momentum dumping in the momentum wheel control mode.

Information concerning the orientation and angular velocity of spacecraft (14) about each of the three axes is gathered by attitude sensors (12), weighted by compensation electronics (10) and fed to processor (2) each processed error cycle period T1.

The present invention ahcieves better resolution of attitude control than prior art systems. In part, this is attributable to the PWPF apparatus comprising processor (2), filters (16), limiter circuits (29), hysteresis circuits (22), and data registers (24). A PWPF loop for each axes is actuated once for each thruster command period T2 (there are preferably several T2's per processed error cycle period T1, to improve resolution). Thus is generated each T1 a thruster pulsetrain signature for instructing each thruster whether and when to fire during the next T1. It is assumed that there are six spacecraft thrusters positioned to impart both directions of angular momentum to spacecraft (14) about the three orthogonal axes (a positive rotation thruster and a negative rotation thruster for each axis). Each thruster pulsetrain signature is a sophisticated sequence of a variable number of logical plus one pulses, minus one pulses, and zero level pulses, each having variable width.

A set of pulsetrain signatures is loaded into shift registers (44, 46) each T1 and outputted to the spacecraft thruster coils each T3, where T3 is preferably less than T2 to minimize the impact of synchronization errors. Data extenders (40, 42) are serially connected to shift registers (44, 46) and insure that there is continuity between each T1's series of pulses so that the thruster valves do not unnecessarily open and close.

BRIEF DESCRIPTION OF THE DRAWINGS

These and other more detailed and specific objects and features of the present invention are more fully disclosed in the following specification, reference being had to the accompanying drawings, in which:

FIG. 2 is a timing diagram showing a typical thruster pulsetrain signature as a function of processed error cycle period T1 and thruster command period T2;

FIG. 3 is a table showing the status of formatter (30, 32) corresponding to the thruster pulsetrain signature 30 depicted in FIG. 2;

FIG. 4 is a schematic representation of each limiter circuit 20; and

FIG. 5 is a schematic representation of each hysteresis circuit 22.

DETAILED DESCRIPTION OF THE PREFERRED EMBODIMENTS

Figure 1:
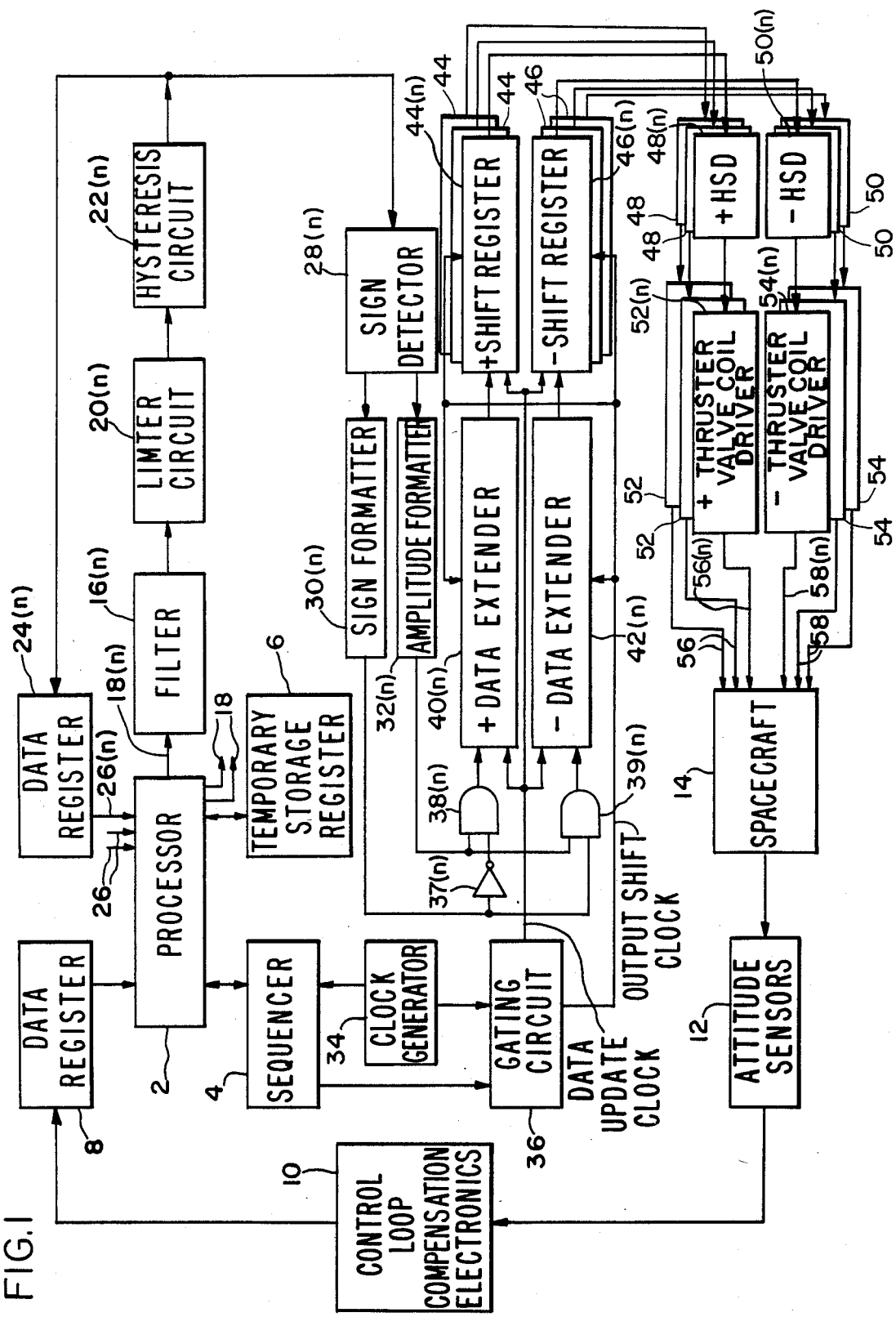
FIG. 1 is a functional block diagram of a preferred embodiment of the present invention.

In FIG. 1, spacecraft 14, which can be a missile but for the purposes of this discussion is assumed to be a satellite, must be stabilized about three orthogonal axes commonly designated roll, pitch, and yaw. Attitude sensors 12 measure the angular deviation of spacecraft 14 with respect to the desired orientation of each of the three axes, e.g., by means of earth sensors and sun sensors. Sensors 12 further measure the angular velocity of spacecraft 14 about each of the three axes, e.g., by means of rate gyros. These six signals are fed by attitude sensors 12 into control loop compensation electronics 10, which weights the angular deviation and the angular velocity signals according to their relative importance in attitude control according to control laws. Compensation electronics 10 also contains circuitry to insure that the frequency of thruster firings on board spacecraft 14 does not interact with the structural frequencies of spacecraft 14 to cause instability.

The output information from compensation electronics 10 is fed into data register 8, a buffer between the data gathering equipment just described and processor 2. Register 8 is typically a digital serial-in parallel-out register; its composite error signal output is fed to processor 2 once every processed error cycle period T1, with the error information typically separately identified for each of the three axes. It is desirable to make T1 as small as possible to improve the stability of this sampled data system and the resolution of the processed signals. In an attitude controller which has been built following the teachings of the present invention, T1 is 64 milliseconds. With T1=64 ms, a wide bandwidth controller up to 49 radians per second can be synthesized without violating Shannon's Theorem.

Sequencer 4 is a controller such as a programmed digital computer which bidirectionally communicates with processor 2. Every T1, sequencer 4 sends a first signal informing gating circuit 36 that a processed error cycle has ended, and sends a second signal to processor 2 instructing it to accept new data from register 8 and commence actuation of a new round of PWPF loops. Said first signal could also be sent directly from clock generator 34 to gating circuit 36. Sequencer 4 also acts as a time sharing interface so that other functions (not illustrated here) associated with controlling spacecraft 14, such as TT&C, magnetic control torquer loops, etc., can also use the services of processor 2 on a time shared basis. As mentioned above, this is a major advantage of employing this digital attitude control system because it enables an overall savings of weight and power on board spacecraft 14.

Processor 2 is essentially a microprocessor arithmetic logic unit. It communicates bidirectionally with temporary storage register 6, typically a RAM scratchpad memory used for making calculations and for storing, for each of the three axes, the output of the last PWPF loop of each processed error cycle for use in the first PWPF loop for the next processed error cycle.

The PWPF apparatus, which performs PWPF loops for all three axes, comprises processor 2, three filters 16 (one for each axis), three limiter circuits 20 (one for each axis), three hysteresis circuits 22 (one for each axis), and three data registers 24 (one for each axis). To avoid cluttering the drawing, FIG. 1 illustrates just one each of items 16, 20, 22, and 24 using the letter n in parenthesis to indicate that the item illustrated is but one of three siblings. Whenever used in this specification, n means one of 1, 2, and 3, representing roll, pitch, and yaw, respectively. Wires 18 connect processor 2 with filters 16; wires 26 connect registers 24 with processor 2. For each n, n=1, 2, 3, the output of filter 16(n) is connected to the input of limiter circuit 20(n), the output of which is connected to the input of hysteresis circuit 22(n), the output of which is connected to the input of data register 24(n).

The amount of time assigned to the output of each PWPF loop for each axis is designated the thruster command period T2. It is desirable that T2 be smaller than T1 to improve thruster command signal resolution, although T2 could equal T1. In the above mentioned working embodiment, T1=4T2, i.e., T2 is 16 milliseconds. Thus, a PWPF loop for each axis is actuated four times during each T1. The output of each of these twelve negative feedback loops is either a logical +1, −1, or 0. +1 indicates that the positive thruster for that axis, but not the negative thruster, should be fired. −1 indicates that the negative thruster for that axis, but not the positive thruster, should be fired. 0 indicates that neither the positive nor the negative thruster for that axis should be fired. The actual firing of the thrusters occurs during the next processed error cycle. Together, the T1/T2 outputs of each PWPF loop constitute one T1's-worth of the thruster pulsetrain signature for the thruster associated with that axis. A typical pulsetrain signature is shown in FIG. 2 over a time of 6T1.

It is assumed that spacecraft 14 has six thrusters (or other angular velocity imparting means) positioned to impart angular velocity to spacecraft 14 about each of the three axes in each of a positive rotational sense and an opposite negative rotational sense. A prudent spacecraft 14 designer will provide a set of six backup thrusters to be used if one or more of the primary thrusters should fail. The thrusters impart motion to spacecraft 14 pursuant to Newtonian laws of physics, typically by firing a gas. The firing may be actuated by electrically charging a coil associated with the selected thruster.

For each axis, sign detector 28(n) determines the sign of each output of the PWPF loop (typically stored as the most significant bit of the data word presented to the input of 28(n)) and gates the sign information to sign formatter 30(n). Each of the three formatters 30/32 stores the pulsetrain signature for one of the axes and breaks it up into smaller bits. In the illustrated embodiment, a minus sign is represented as a logical one and a plus sign is represented as a logical zero within sign formatter 30(n).

Sign detector 28(n) also extracts the amplitude information from the output of each PWPF loop (typically the least significant bit of the data word presented at the input of 28(n)) and gates this information, either a logical one or a logical zero, to amplitude formatter 32(n).

Formatters 30/32 are each typically serial-in parallel-out shift registers in combination with data splitters. The input shift register portion of each formatter has T1/T2 columns, one for each of the PWPF loop outputs produced each T1. In the example discussed herein, the number of columns is 4. The data splitter portion of each formatter 30, 32 can be, e.g., simply a set of wires to split each data bit into T2/T3 clone data bits, where T3 is the period of the Output Shift Clock used to output data from shift registers 44 and 46. The reason for the data splitting is to minimize the impact of synchronization discrepancies between the Output Shift Clock and the Data Update Clock used to load data into registers 44, 46; e.g., with the data splitting, an error of duration T3 would be made due to a missed clock pulse, rather than an error of duration T2.

In the embodiment described herein, T3 is four milliseconds, so each thruster pulsetrain signature residing within a formatter 30 or 32 has sixteen bits for each period of time T1. Within each period of time T2, all bits are the same. This is shown in FIG. 3 for the signature depicted in FIG. 2.

Clock generator 34 produces all the clocks necessary for timing the FIG. 1 circuit, starting with a first clock at the fastest rate needed by the circuit. In the embodiment illustrated, this fastest clock signal is 500 KHz, and is sent to gating circuit 36. This is the rate at which the Data Update Clock loads extenders 40 and 42 and registers 44 and 46 from formatters 30 and 32. Clock generator 34 divides the fastest clock into three slower clocks, e.g., by a set of flip-flops. These clocks have periods of T1, T2, and T3, respectively. The T3 clock signal is also sent to gating circuit 36 where it is subsequently used as the constantly-running Output Shift Clock. The T1 and T2 clock signals are sent to sequencer 4.

Gating circuit 36 receives a signal from sequencer 4 (or generator 34) at the end of each T1 period, and in response to this signal, actuates T1/T3+x cycles of the Data Update Clock, causing T1/T3+x bits from each amplitude formatter 32(n) to be read into data extenders 40(n) and 42(n) and shift registers 44(n) and 46(n). A bit from amplitude formatter 32(n) will be read into the combined register consisting of positive data extender 40(n) and positive shift register 44(n) if the sign of that bit, as evidenced by the corresponding bit position within sign formatter 30(n), is zero. On the other hand, a bit from amplitude formatter 32(n) will be read into the combined register consisting of negative data extender 42(n) and negative shift register 46(n) if the sign of that bit is negative, as evidenced by a logical 1 appearing in the corresponding bit position for sign formatter 30(n). This gating into the positive versus the negative logic is accomplished by means of gating circuitry for each axis consisting of inverter 37(n) and AND gates 38(n) and 39(n). The output of sign formatter 30(n) is connected to the input of inverter 37(n) and to a first input of AND gate 39(n). The output of amplitude formatter 32(n) is connected to the second input of AND gate 39(n) and to a first input of AND gates 38(n). The output of inverter 37(n) is connected to the second input of AND gate 38(n). The output of AND gate 38(n) is connected to the input of positive data extender 40(n) and the output of AND gate 39(n) is connected to the input of negative data extender 42(n).

Since the Data Update Clock is much faster than the Output Shift Clock, the Output Shift Clock can be left running continuously. The value of x should be at least 1. In the illustrated embodiment, x was chosen to be 2. Thus, at the end of each T1, 18 pulses of the Data Update Clock are activated, loading 18 bits from amplitude formatter 32(n) into data extenders 40(n), 42(n) and shift registers 44(n), 46(n).

Shift registers 44, 46 are all serial-out shift registers whose output shifting is conctrlled by the Output Shift Clock and whose input loading is controlled by the Data Update Clock. Data extenders 40, 42 are e.g.; latches, and each imparts a delay of xT3. Extenders 40, 42 are also loaded by the Data Update Clock and shifted out by the Output Shift Clock. Each positive data extender 40(n) is connected in series with a positive shift register 44(n) and each negative data extender 42(n) is connected in series with a negative shift register 46(n), making composite shift registers of 18 bit positions each for the example illustrated. Because of the latching action of each data extender, the last bit to be loaded into its associated shift register is repeated twice by the data extender. For example, if the 16th bit shifted into positive shift register 44(l) is a 1, then the two bits within positive data extender 40(l) are also 1's. The reason for the redundancy provided by the data extenders is to provide continuity between processed error cycles, avoiding data gaps in case, e.g., the signal to gating circuit 36 announcing the end of a processed error cycle arrives late. By this means, unwanted turn-on's and turn-off's of thrusters is avoided.

A positive output bit from a register 44 or 46 is typically an electrical signal having a potential of 5 volts, indicating that a thruster is desired to be actuated for that time T3, which a logical zero output bit is an electrical signal having zero volts. The three positive high side drivers 48 and the three negative high side drivers 50 simply serve to increase the 5 volt signals to a higher level more suitable for spacecraft 14, e.g., 26 volts, to overcome noise and transients on spacecraft 14, while passing-through zero volt signals unchanged. Thus, the six high side drivers 48 and 50 can be voltage translators.

For each axis, a signal is fed from the positive high side driver 48(n) and the negative high side driver 50(n) to a positive thruster valve coil driver 52(n) and a negative thruster valve coil driver 54(n), respectively. Each driver 52, 54 typically increases the voltage for a logical one to 42 volts, applying this voltage to a thruster coil which energizes the proper thruster. A zero volt output from a high side driver 48, 50, results in a zero volt output from its associated coil driver 52, 54, which deactivates the associated thruster.

The PWPF apparatus will now be described in more detail. Each filter 16 is typically a single-pole low pass integrating filter having a transfer function of the form $K/(TS+1)$, where S is the integrating operator, T is a time constant, and K is proportional to the gain. Filter 16 smooths out high frequency voltage excursions on the input error signal. Filter 16 can be implemented as part of a digital computer, e.g., each filter 16 can be part of processor 2. In an analog embodiment, filter 16 might have a capacitor and an inductor. The output from each filter 16 is designated A1 and becomes the input to its corresponding limiter 20, the function of which is shown is FIG. 4, wherein the input is represented as being along the X axis and the output along the Y axis. If the absolute value of A1 is less than or equal to pre-established threshold A5, A1 will pass through limiter 20 unchanged, because the slope of the limiter's curve in the vicinity of the axe's intersection is one. Positive values of A1 in excess of A5 are limited to A5, and negative values of A1 less than −A5 are limited to −A5. The function of limiter 20 is to lower the recovery time of the loop. Such limiters 20 are conventionally available in digital hardware. An analog example of such a filter is a pair of back-to-back Zener diodes.

The output from each limiter 20 is passed to the hysteresis circuit 22 for that axis, schown schematically in FIG. 5. Assume that the initial input and output for circuit 22 are each zero, and the input starts to increase. Once the input exceeds A7, the output of circuit 22 will be a 1. The output of circuit 22 will remain high as the input decreases below A7 until the input reaches −A6, whereupon the output of circuit 22 will become zero. As the input declines even further, the output of circuit 22 will remain zero until the input is less than −A7, whereupon the output of circuit 22 will be −1. As the input passes −A7 from a negative direction, the output of circuit 22 will remain a −1 until such time as the input exceeds A6, whereupon the output of circuit 22 will become zero. It is desirable to vertically overlap the hysteresis loop (e.g., a zero input can result in a −1, 0, or 1 output depending upon the input's history) because overlapping the hysteresis loop modifies its phase relationship with respect to the error signal from register 8 and improves the phase margin of the compensation.

Each data register 24 is the recipient of the output produced by its corresponding hysteresis circuit 22. This output is fed to processor 2, is inverted, and is added to the portion of the error signal received from data register 8 for that axis for inputting to filter 16 as the error input for the next iteration of the PWPF loop for that axis. This negative feedback via register 24 is used even when said next PWPF loop iteration occurs during the next T1 interval, i.e., the data from register 8 has been updated.

Elements 16, 20, 22, 28, 30, 32, 37, 38, and 39 could be replaced by a programmable read-only memory (PROM) connected to sequencer 4 and processor 2, whereupon sequencer 4 feeds preselected constants to the PROM, which then instructs processor 2 to execute the twelve PWPF loops. Such a PROM has been constructed, programmed in the FORTRAN language as follows:

LINE

1. SUBROUTINE PWPF
2. IMPLICIT INTEGER*2(E-S)
3. *SBR PWPF
4. COMMON/VARI/A1,A2,A3,A4,A5,A6,A7,A8,A9,A10,A11
5. COMMON/VARI2/I1,I2,I3,I4,I5,I6,I7,I8,I9,I10,I11,I12
6. I1=0
7. I3=0
8. I4=15
9. DO 1 I=1,4
10. *CALC XRP,XPP,YP
11. A1=A4*(A2−A3)+A8*A1
12. *CALC YR,YYP,YY
13. IF(A1.GT.A5) A1=A5
14. IF(A1.LT.−A5) A1=−A5
15. IF(A1.GE.A6.AND.A3.EQ.−1.) A3=0.
16. IF(A1.GE.A7) A3=1.
17. IF(A1.LE.−A6.AND.A3.EQ.1.) A3=0.
18. IF(A1.LE.−A7) A3=−1.
19. *CALC THRUSTERS
20. IF(A3.EQ.1.) I1=IOR2(I1,I4)
21. IF(A3.EQ.−1) I1−IOR2(I3,I4)
22. 1 I4=ISHFT2(I4,4)
23. I7=32768*A1
24. RETURN
25. END

In the above program, A4=K/T and A8=(1-1/T), where K and T are the aforementioned filter 16 constants.

Line 11 of the program embodies the operation of filter 16(n) with constants supplied by sequencer 4. Lines 13 and 14 embody the function of limiter circuit 20(n), lines 15 through 18 embody the functioning of hysteresis circuit 22, and lines 20–22 embody formatting and sign assignment.

This one PROM program embodies the PWPF loops for all three axes, the individual constants for each loop are fed into the PROM by sequencer 4.

Sequencer 4 could command processor 2 to perform the PWPF loops in any order. In the illustrated embodiment, the twelve PWPF loops are separated axis-wise so that the four roll loops are first performed, followed by the four pitch loops, then the four yaw loops. Each of the PWPF loop outputs corresponds to the 16 milliseconds of the thruster command period, while the execution of each loop takes just one millisecond of processor 2 time. The remaining processor 2 time is used to perform other spacecraft 14 functions, as described above.

In selecting suitable PWPF constants, it should be noted that the constants influence each other synergistically, and perhaps for this reason, their selection is somewhat heuristic. In general, increasing A4 (filter gain) increases the on/off frequency of the pulses while lowering the average pulse width. Increasing filter constant A8 enables the filter to smooth out lower frequency spikes and makes for a longer average thruster pulse width. If A5 were larger it would take longer for thruster pulses to change state. Natually, A7 must be greater than A6. If minus A6 were a positive number, thrusters would turn off faster in response to downward decreasing signals on the input of hysteresis 22. If A7 were greater, it would be more difficult to turn on a thruster. The following example gives the values of constants used in the illustrated embodiment:

|    | roll  | pitch | yaw   |
|----|-------|-------|-------|
| A4 | 8.2   | 11.5  | 12.1  |
| A8 | 0.52  | 0.52  | 0.52  |
| A5 | 0.235 | 0.328 | 0.347 |
| A6 | 0.05  | 0.07  | 0.08  |
| A7 | 0.2   | 0.27  | 0.29  |

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An apparatus for controlling the attitude of a spacecraft with respect to each of three orthogonal reference axes, comprising:
   means for imparting angular velocity to the spacecraft about each of three orthogonal spacecraft axes that are fixed with respect to the spacecraft;
   means for measuring the angle between each spacecraft axis and a corresponding one of the reference axes, and for measuring the angular velocity of the spacecraft about each of the spacecraft axes; and means for periodically observing output signals produced by the measuring means and creating in response thereto a digital pulsetrain signature for each spacecraft axis for aligning said spacecraft axis with its corresponding reference axis;

wherein each digital pulsetrain signature has a varying number of pulses of varying duration, and is loaded into a shift register which piecewise outputs a signal for alternately switching on and off the imparting means for the corresponding spacecraft axis in response thereto; and each pulsetrain signature is generated by PWPF means situated within said observing and creating means and comprising:

a filter for smoothing out high frequency transients on the signals produced by the measuring means;

a hysteresis circuit having an input coupled to an output of the filter, wherein the filter's output is subjected to a hysteresis loop and is thereby converted into a PWPF signal having a value of a logical one, a logical zero, or a logical negative one; and a digital processor having an input coupled to an output of the hysteresis circuit and an output coupled to an input of the filter, wherein the processor initiates operation of the PWPF means.

2. The apparatus of claim 1 wherein the imparting means comprises two thrusters for each of the spacecraft axes, one thruster disposed to impart angular velocity in a certain direction about that axis and the other thruster disposed to impart angular velocity in the opposing direction;

wherein there is one shift register associated with each thruster and one pulsetrain signature associated with each shift register.

3. The apparatus of claim 1 wherein the spacecraft is a satellite, and the apparatus can be used to control the attitude of the satellite during all phases of its life, including parking orbit maneuvers; automatic nutation control; initial transfer orbit maneuvers, including sun acquisition, earth acquisition, and apogee motor firing; and all final operational orbit attitude control maneuvers, including attitude control during stationkeeping and wheel momentum unloading.

4. The apparatus of claim 1 wherein each pulsetrain signature comprises pulses of varying duration that can have values of logical one, logical zero, and logical negative one, representing, respectively, turning on the imparting means in a first direction about the corresponding spacecraft axis, not turning on the imparting means, and turning on the imparting means about the corresponding spacecraft axis in a direction opposite the first direction.

5. The apparatus of claim 1 wherein each PWPF means further comprises:

a limiter circuit interposed between the filter and the hysteresis circuit, wherein the limiter limits the filter's output to within a certain preselected range; and a data register interposed between the hysteresis circuit and the processor, wherein:

the data register stores the output of the hysteresis circuit and sends an output to the processor; and the processor inverts the output of the data register and sums the data register's inverted output with output signals produced by the measuring means.

6. The apparatus of claim 5 wherein there are three sets of PWPF means, one set for each spacecraft axis, and each set is operated at least once each said observation period.

7. An apparatus for controlling the attitude of a spacecraft with respect to each of three orthogonal reference axes, comprising:

means for imparting angular velocity to the spacecraft about each of three orthogonal spacecraft axes that are fixed with respect to the spacecraft;

means for measuring the angle between each spacecraft axis and a corresponding one of the reference axes, and for measuring the angular velocity of the spacecraft about each of the spacecraft axes; and means for periodically observing output signals produced by the measuring means and creating in response thereto a pulsetrain signature for each spacecraft axis for aligning said spacecraft axis with its corresponding reference axis;

wherein each pulsetrain signature has a varying number of pulses of varying duration, and is loaded into a shift register which piecewise outputs a signal for alternately switching on and off the imparting means for the corresponding spacecraft axis in response thereto;

said apparatus further comprising means for splitting each of said pulses into several bits of shorter duration each having the same amplitude as its precursor pulse;

wherein the bits are loaded into the shift registers for subsequent piecewise outputting to the imparting means.

8. The apparatus of claim 7 further comprising latching means serially connected to each shift register, wherein the latching means reproduces at least part of the split pulsetrain signature within its corresponding shift register to compensate for possible asynchronization gaps and thereby prevent unwanted switching of the imparting means.

* * * * *